United States Patent
Imano et al.

(10) Patent No.: US 9,878,403 B2
(45) Date of Patent: Jan. 30, 2018

(54) NI-BASED ALLOY FOR WELDING MATERIAL AND WELDING WIRE, ROD AND POWER

(71) Applicant: Hitachi, Ltd., Tokyo (JP)

(72) Inventors: Shinya Imano, Hitachi (JP); Hiroyuki Doi, Tokai (JP); Jun Sato, Yasugi (JP)

(73) Assignee: MITSUBISHI HITACHI POWER SYSTEMS, LTD., Yokohama, Kanagawa (JP)

( * ) Notice: Subject to any disclaimer, the term of this patent is extended or adjusted under 35 U.S.C. 154(b) by 0 days.

(21) Appl. No.: 13/770,620

(22) Filed: Feb. 19, 2013

(65) Prior Publication Data
US 2013/0255442 A1    Oct. 3, 2013

(30) Foreign Application Priority Data

Mar. 30, 2012 (JP) ................... 2012-079102

(51) Int. Cl.
| B23K 35/22 | (2006.01) |
| B23K 35/30 | (2006.01) |
| C22C 19/05 | (2006.01) |
| C22C 30/00 | (2006.01) |
| B23K 35/02 | (2006.01) |

(52) U.S. Cl.
CPC ...... *B23K 35/3033* (2013.01); *B23K 35/0244* (2013.01); *B23K 35/0261* (2013.01); *B23K 35/304* (2013.01); *C22C 19/056* (2013.01); *C22C 30/00* (2013.01)

(58) Field of Classification Search
CPC .............. B23K 35/304; B23K 35/0261; B23K 35/3033
See application file for complete search history.

(56) References Cited

U.S. PATENT DOCUMENTS

| 2003/0005981 A1* | 1/2003 | Ogawa ................. B23K 35/304 148/428 |
| 2004/0076540 A1* | 4/2004 | Imano et al. ................. 420/450 |
| 2010/0166594 A1* | 7/2010 | Hirata .................... C21D 6/001 420/443 |

FOREIGN PATENT DOCUMENTS

| EP | 1 410 872 A1 | 4/2004 |
| EP | 2 050 830 A1 | 10/2008 |
| EP | 2 354 262 A1 | 2/2011 |
| EP | 2 302 085 A1 | 3/2011 |
| JP | 2004-136301 A | 5/2004 |
| JP | 2010-065547 A | 3/2010 |
| JP | 2010-084167 A | 4/2010 |
| JP | 2010084167 A * | 4/2010 ............. C22C 19/05 |

OTHER PUBLICATIONS

ASM Specialty Handbook, pp. 302-304, Dec. 2000.*

* cited by examiner

Primary Examiner — Kaj K Olsen
Assistant Examiner — Alexander Polyansky
(74) Attorney, Agent, or Firm — Volpe and Koenig, P.C.

(57) ABSTRACT

A Ni-based alloy for a welding material including, by mass, 0.001 to 0.1% of C, 18 to 25% of Co, 16 to 20% of Cr, 2.5 to 3.5% of Al, 9.0 to 15.0% of Mo+W, 0.001 to 0.03% of B and the balance being Ni and inevitable impurities.

6 Claims, 2 Drawing Sheets

NI-BASED ALLOY FOR WELDING MATERIAL AND WELDING WIRE, ROD AND POWER

FIELD OF THE INVENTION

The present invention relates to a high strength Ni-based alloy that is of γ' precipitation strengthening type and also has excellent weldability.

DESCRIPTION OF RELATED ART

A ferrite-based heat resistant steel, a Ni-based superalloy or the like have an excellent strength at a high temperature and are used for various high temperature components for a thermal power-generating plant. Many of these materials are welded to form structural components. Since a service temperature of the materials rises higher along with improvement of power generation efficiency, the welding material is required to have high strength properties.

While the welding include arc welding, laser welding and electron beam welding, they all include steps of once melting the metal material and solidifying it. A large thermal stress generates in the metal material during cooling, since it shrinks during the solidification. A high strength material such as the Ni-based alloy is tend to have a low ductility while it has a high strength, and thus has a low weldability. For instance, a weld crack occurs due to the thermal stress. Particularly, for an alloy strengthened by precipitation of a γ'(Ni$_3$Al) phase, a weld crack possibly generates when the γ' phase precipitates during the welding or cooling.

A welded portion has a solidification structure, and solidification segregation occurs therein. There is a high possibility that a brittle harmful phase is generated in the solidification segregation portion, and the harmful phase also becomes a factor of promoting a weld crack. In addition, at a temperature of 700 to 800° C., which is a service temperature, a structural change occurs due to atom diffusion. Accordingly, there is a possibility that an anomalous precipitate may be generated that is not formed in an equilibrium state in the solidification segregation part. When the precipitate is generated, there is a possibility that a strength of the material is lowered and the components are damaged, thereby a severe problem for an operation of the power-generating plant occurs.

Therefore, the welding material is required to have excellent weldability, to be hard to cause the weld crack, and to have a phase stability of the solidification structure so as not to generate the harmful phase even when used for a long period of time, in addition to have a sufficient strength at a service temperature. However, such a material as to satisfy the properties at the service temperature of 700 to 800° C. is not yet provided by a conventional technology.

For instance, JP-A-2010-84167 and JP-A-2004-136301 disclose a Ni-based alloy welding material that is controlled of a solid solution temperature or an amount of the γ phase precipitation to obtain both strength and weldability.

The alloy in JP-A-2010-84167 is controlled to have the solid solution temperature of the γ' phase of 840° C. or lower, thereby improving the weldability, and the γ' phase is precipitated by a heat treatment at 600 to 700° C. to obtain the strength. This alloy is suitable to be welded with a ferritic steel.

A welding material in JP-A-2004-136301 is suitable for a weld repair of a gas turbine moving blade used at a temperature exceeding 1,000° C. The welding material includes aluminum for mainly improving oxidation resistance, and 0.05 to 0.15 wt % of carbon which is equivalent to that of a cast Ni-based alloy, so as to be used at a temperature exceeding 1,000° C. Carbon forms an M$_{23}$C$_6$ type carbide, which controls a shape of a grain boundary to a dendritic shape at a temperature exceeding 1,000° C. and can retard a progress of the crack through the grain boundary. In addition, since the moving blade to which the welding material is applied is subjected to a heat treatment of 1,100° C. or higher as a solution heat treatment after the repair welding, it is considered that the solidification segregation formed in the welding process sufficiently diffuses and the material is homogenized to a degree that the harmful phase is not formed.

SUMMARY OF THE INVENTION

The alloy in JP-A-2010-84167 does not have a sufficient strength at a temperature of 700 to 800° C., since the alloy contains a small amount of γ phase and a limited amount of a solid solution strengthening element from a viewpoint of structural stability.

The moving blade to which the welding material in JP-A-2004-136301 is applied can not be expected to be sufficiently homogenized at a temperature of 700 to 800° C., and accordingly it becomes a problem that a harmful phase precipitates due to solidification segregation.

As described above, a conventional Ni-based alloy has either good weldability and insufficient strength, or poor weldability and high strength. Thus, it has been impossible that the conventional alloy is directly applied to the use at 700 to 800° C.

An objective of the present invention is to provide an Ni-based alloy for a welding material having a high welded joint strength at a temperature of 700 to 800° C. and also having excellent weldability and workability.

The Ni-based alloy according to the present invention includes, by mass, 0.001 to 0.1% C, 18 to 25% Co, 16 to 20% Cr, 2.5 to 3.5% Al, 9.0 to 15.0% Mo+W, and 0.001 to 0.03% B.

The present invention can provide an Ni-based alloy for a welding material of a γ' phase precipitation strengthening type having excellent high-temperature strength as well as excellent weldability and workability. Thus, it can contribute to high temperature operation and an improved efficiency of a power-generating plant.

Other objects, features and advantages of the invention will become apparent from the following description of the embodiments of the invention taken in conjunction with the accompanying drawings.

DETAILED DESCRIPTION OF THE INVENTION

Figure 1:
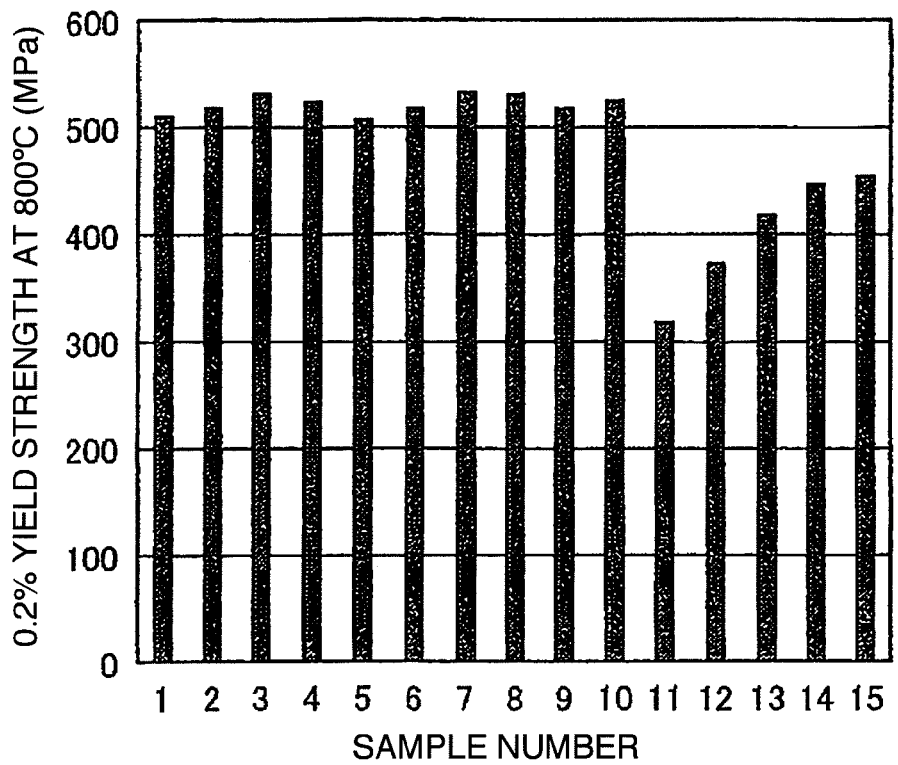
FIG. 1 is a graph of 0.2% yield strength at 800° C. of alloys, through a tensile test of welded joints.

The present inventors have studied to improve properties of a welding material through a material test and a thermo-dynamic calculation. As a result, the present inventors have come to develop a welding material that can be used at a temperature of 700 to 800° C., by selecting an alloy composition.

In this description, carbon, cobalt, chromium, aluminum, molybdenum, tungsten, boron and nickel are represented by element symbols of "C", "Co", "Cr", "Al", "Mo", "W", "B" and "Ni", respectively. In addition, "Mo+W" represents a total amount of molybdenum and tungsten.

The Ni-based alloy for the welding material, and a welding wire, a welding rod and a welding powder including the material according to an embodiment of the present invention will be described below.

The Ni-based alloy for the welding material includes, by mass, 0.001 to 0.1% C, 18 to 25% Co, 16 to 20% Cr, 2.5 to 3.5% Al, 9.0 to 15.0% Mo+W, 0.001 to 0.03% B and the balance being Ni and inevitable impurities.

The Ni-based alloy preferably includes, by mass, 0.001 to 0.05% C, 18 to 25% Co, 16 to 20% Cr, 2.5 to 3.5% Al, 9.0 to 15.0% Mo+W, 0.001 to 0.03% B and the balance being Ni and inevitable impurities.

The Ni-based alloy preferably includes, by mass, 0.001 to 0.05% C, 18 to 25% Co, 16 to 20% Cr, 2.5 to 3.5% Al, 10.0 to 14.0% Mo+W, 0.001 to 0.03% B and the balance being Ni and inevitable impurities.

The Ni-based alloy preferably includes, by mass, 0.01 to 0.04% C, 20 to 23% Co, 17 to 19% Cr, 2.8 to 3.2% Al, 10.0 to 12.0% Mo+W, 0.003 to 0.01% B and the balance being Ni and inevitable impurities.

For the Ni-based alloy, it is preferable that a solid solution temperature of a γ'(Ni$_3$Al) strengthening phase is in a range of 850 to 900° C. and a precipitation amount at 800° C. is 10 to 25% by volume.

For the Ni-based alloy, a creep rupture time of a welded portion under conditions of 800° C. and 294 MPa is preferably 200 hours or longer.

The Ni-based alloy can be supplied in forms of a welding wire, a welding rod, a welding powder or the like.

Compositional range of elements constituting the Ni-based alloy and reason for the limitation will be described below. The following percentage is by mass unless otherwise described.

C dissolves in a matrix to improve a tensile strength at a high temperature, and forms a carbide such as MC and $M_{23}C_6$. The precipitates mainly precipitate in a grain boundary of a dendrite structure which is formed during solidification of the alloy and have an effect of strengthening the grain boundary by preventing the grain boundary from being linearized. This effect is confirmed from an amount of approximately 0.001%. The grain boundary strengthening due to the carbide is particularly important when the alloy is used at a high temperature exceeding 1,000° C. as disclosed in JP-A-2010-84167, and it is desirable to increase the amount of precipitates as well by increasing the carbon content.

However, C easily forms segregation during the solidification. When C is excessively added, a weld crack due to the segregation is promoted. If the segregation remains, a coarse carbide may precipitate and embrittle the material when the alloy is held at high temperature for a long time period.

When used at a temperature of 800° C. or lower, diffusion does not occur so much and the linearization of the grain boundary is hard to occur, as compared to the case of 1,000° C. Accordingly, C may be decreased as compared with an amount in the welding material of a gas turbine moving blade and an upper limit of the C content is set at 0.1%. It becomes possible to suppress the weld crack and the embrittlement which originate in the segregation, by decreasing the C content. A preferable range is 0.001 to 0.05%, more preferably 0.01 to 0.05%.

Co substitutes for Ni and dissolves in a matrix. Thus, Co has an effect of increasing a strength of a substrate at high temperature. This effect becomes remarkably when 18% or more of Co is substituted. Co forms a harmful phase more easily than Ni from a viewpoint of phase stability. When the Co content exceeds 25%, precipitation of a harmful phase such as a σ phase or a μ phase generates. Therefore, a preferable range is 18 to 25%. Further preferable range is 2.0 to 23%.

Cr forms a dense oxide film of $Cr_2O_3$ on a surface of the alloy, and has an effect of increasing oxidation resistance and corrosion resistance at a high temperature. It is necessary to contain at least 16% of Cr from a viewpoint of the oxidation resistance and the corrosion resistance of a weld portion. However, when the content exceeds 20%, the σ phase precipitates, and the ductility and fracture toughness of the material are deteriorated. Accordingly, the content is determined to be 20% or less. Therefore, a preferable range is 16 to 20%. A particularly suitable range is 17 to 19%.

Al forms a γ'(Ni$_3$Al) phase, and is indispensable for increasing a strength of the Ni based alloy. In order to obtain a sufficient strength, an amount of a precipitated γ'(Ni$_3$Al) phase needs to be 10% or more by volume. In order to precipitate the amount at 700 to 800° C. which is an assumed service temperature, an Al content needs to be 2.5% or more by mass. As the Al content increases, a strength increases while weldability decreases. The present invention includes controlling of a solid solution temperature of the γ'(Ni$_3$Al) phase to 900° C. or lower from a viewpoint of suppressing of a weld crack. For this reason, an upper limit of the Al content is be 3.5%. A preferable range is 2.5 to 3.5%. A further preferable range is 2.8 to 3.2% from the balance between the strength and the weldability.

Mo and W have an effect of strengthening a matrix by solid solution strengthening. For the alloy of the present invention, an upper limit of the Al content is determined from a viewpoint of weldability. Therefore, the alloy desirably includes a large amount of Mo and W so as to increase its strength. In order to obtain a sufficient strength at 800° C., a total amount of Mo and W needs to be 9.0% or more.

JP-A-2010-84167 also discloses that large amounts of elements such as Mo and W are added. A substrate which is an object to be welded in the present invention is a Ni based alloy which is hard to form a harmful phase in a weld dilution zone as compared with a ferritic steel. Therefore, Mo and W in a total amount of 15.0% can be added at maximum. When an amount of Mo and W exceeds 15.0%, a hard and brittle intermetallic compound phase is generated in a weld metal itself. Therefore, a preferable range is 9.0 to 15.0%. A further preferable range is 10.0 to 14.0%, and the particularly preferable range is 10.0 to 12.0%.

B has an effect of increasing a strength of a grain boundary similarly to C, and ductility at a high temperature can be expected to be improved by an addition of B This effect can be obtained by 0.001% of B. However, when an B content exceeds 0.03%, B causes partial melting of the grain boundary and a precipitation of a harmful phase. Therefore, a preferable range is 0.001 to 0.03%. Further preferable properties of the alloy are obtained in a range of 0.003 to 0.015%.

Examples and comparative examples will be described in detail below.

Table 1 shows chemical compositions of alloy samples for test. In the Table, Nos. 1 to 10 are examples of the invention, and No. 11 to 15 are comparative examples.

TABLE 1

Alloy sample compositions for test

| Classification | No. | Ni | C | Co | Cr | Al | Mo | W | Mo + W | B | γ' phase Solid solution temperature (° C.) | γ' phase Precipitation amount (%) |
|---|---|---|---|---|---|---|---|---|---|---|---|---|
| Example of the invention | 1 | Balance | 0.10 | 23.0 | 18.0 | 3.0 | 0.0 | 10.0 | 10.0 | 0.012 | 867 | 15.5 |
| | 2 | Balance | 0.10 | 20.0 | 18.0 | 3.2 | 0.0 | 10.0 | 10.0 | 0.005 | 885 | 18.3 |
| | 3 | Balance | 0.05 | 20.0 | 16.0 | 3.5 | 0.0 | 10.0 | 10.0 | 0.005 | 897 | 23.2 |
| | 4 | Balance | 0.045 | 18.0 | 16.0 | 2.8 | 2.5 | 12.0 | 14.5 | 0.005 | 876 | 13.7 |
| | 5 | Balance | 0.045 | 18.0 | 20.0 | 2.5 | 2.5 | 12.0 | 14.5 | 0.010 | 854 | 10.5 |
| | 6 | Balance | 0.045 | 23.0 | 20.0 | 3.0 | 0.0 | 12.0 | 12.0 | 0.010 | 878 | 17.2 |
| | 7 | Balance | 0.01 | 23.0 | 16.0 | 3.2 | 2.5 | 9.0 | 11.5 | 0.015 | 872 | 18.4 |
| | 8 | Balance | 0.01 | 24.5 | 16.0 | 3.2 | 5.0 | 9.0 | 14.0 | 0.015 | 891 | 20.0 |
| | 9 | Balance | 0.005 | 23.0 | 18.0 | 2.8 | 2.5 | 9.0 | 11.5 | 0.015 | 863 | 13.4 |
| | 10 | Balance | 0.005 | 23.0 | 18.0 | 2.8 | 5.0 | 9.0 | 14.0 | 0.015 | 860 | 15.2 |
| Comparative Example | 11 | Balance | 0.20 | 20.0 | 18.0 | 4.0 | 0.0 | 8.0 | 8.0 | 0.006 | 940 | 27.3 |
| | 12 | Balance | 0.10 | 20.0 | 18.0 | 3.8 | 2.5 | 7.5 | 10.0 | 0.012 | 932 | 24.8 |
| | 13 | Balance | 0.05 | 20.0 | 18.0 | 3.6 | 6.0 | 10.0 | 16.0 | 0.012 | 916 | 25.1 |
| | 14 | Balance | 0.03 | 20.0 | 18.0 | 3.0 | 0.0 | 5.0 | 5.0 | 0.006 | 835 | 9.1 |
| | 15 | Balance | 0.03 | 20.0 | 18.0 | 2.4 | 0.0 | 10.0 | 10.0 | 0.006 | 810 | 6.2 |

An 10 kg ingot of each alloy sample was produced by vacuum melting. An oxide film and a casting defect on its surface has been removed from the produced ingot, and the resultant ingot was worked, through a hot forging process and a cold drawing process, into a welding wire with a diameter of 1.2 mm. With use of this welding wire, an Ni-based alloy material having a tubular form with an outer diameter of 34 mm and an inner diameter of 18 mm was TIG welded. Thus, a welded joint for evaluating properties was produced. Here, the TIG welding is an abbreviation of Tungsten Inert Gas welding.

While the alloy was worked into a wire shape and used for welding in the examples, the alloy may be in a rod or powder shape. A test piece was taken from the welded joint, and its high-temperature strength properties were measured by a tensile test and a creep test. In addition, a microstructure of a cross section of the weld portion was observed, and the weldability of each alloy was evaluated by confirming presence or absence of a weld crack or a harmful phase.

Table 2 shows test results on the tensile test, the creep test, and the weldability.

TABLE 2

Evaluation result of properties of each alloy

| Classification | No. | Result of tensile test at high temperature (800° C.) 0.2% yield strength (MPa) | Result of creep test (800° C. and 294 MPa) rupture time (h) | Weldability |
|---|---|---|---|---|
| Example | 1 | 512 | 229 | ○ |
| | 2 | 519 | 246 | ○ |
| | 3 | 531 | 303 | ○ |
| | 4 | 524 | 245 | ○ |
| | 5 | 509 | 224 | ○ |
| | 6 | 520 | 260 | ○ |
| | 7 | 535 | 249 | ○ |
| | 8 | 532 | 237 | ○ |
| | 9 | 518 | 217 | ○ |
| | 10 | 526 | 234 | ○ |
| Comparative Example | 11 | 320 | 95 | x |
| | 12 | 374 | 89 | x |
| | 13 | 420 | 103 | Δ |
| | 14 | 448 | 146 | ○ |
| | 15 | 456 | 108 | ○ |

○: good, Δ: possible, x: impossible

FIG. 1 is a graph showing the 0.2% yield strength of each alloy at 800° C., obtained by the tensile test of the welded joint.

When the alloy is used for a high-temperature member, the alloy is desired to have the 0.2% yield strength of approximately 500 MPa at 800° C., which is an assumed service temperature. All examples of the invention Nos. 1 to 10 have the strength exceeding 500 MPa.

Since the examples are broken at a weld portion in any test, it is considered that the values show the strength of the weld metal itself. The result is almost equivalent to a result of tensile test of forged alloys. In addition, a defect such as a crack was not observed in the weld portion. From this result, it can be determined that all examples of the invention have excellent weldability.

On the other hand, in Comparative Examples 11 to 13, a crack was observed in the weld metal or a boundary portion between the weld metal and the substrate. Therefore, it is considered that breakage has progressed starting from the crack in Comparative Examples 11 to 13. Accordingly, the material has yielded under a stress of 500 MPa or less in the case of Comparative Examples 11 to 13, which stress is lower than the normal strength of the alloy. A factor of the crack is considered that an Al content is large and the precipitation temperature of γ' phase is 900° C. or higher.

In Comparative Examples 14 and 15, the weldability was adequate and the weld crack was not observed. However, since the Al content is small and the precipitation amount of the γ' phase is not sufficient, or since an amount of solid solution strengthening elements Mo+W is not sufficient, the strength is insufficient as the joint although there is no weld defects.

Figure 2:
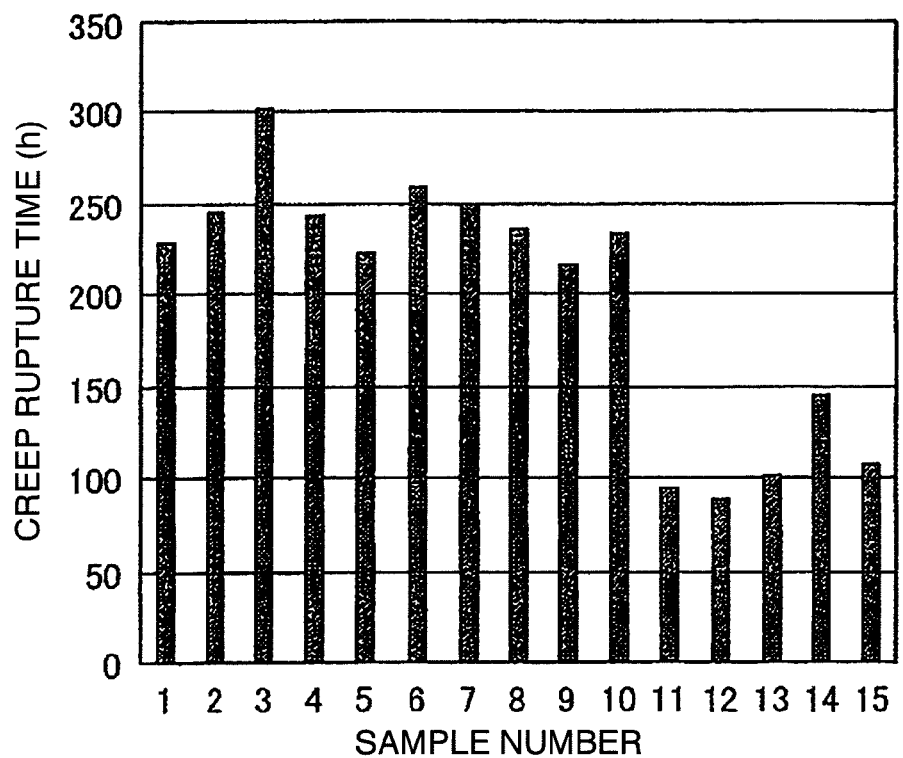
FIG. 2 is a graph of a creep rupture time.

FIG. 2 shows a result of the creep test. Similar tendency as the tensile test is obtained. It may be considered that the alloy is satisfactorily durable at a temperature of 800° C. if the rupture time is 200 hours or longer under the test conditions (800° C. and 294 MPa) of this time.

The examples of the invention include desirable amounts of a precipitation strengthening element and a solid solution strengthening element. They have adequate weldability, and a welded joint thereof has no defect. Accordingly, the examples of the invention has the creep strength exceeding targeted 200 hours.

On the other hand, the comparative examples have only an approximately half of the creep strength due to the weld crack and/or the insufficient strength of the weld metal itself.

Figure 3:
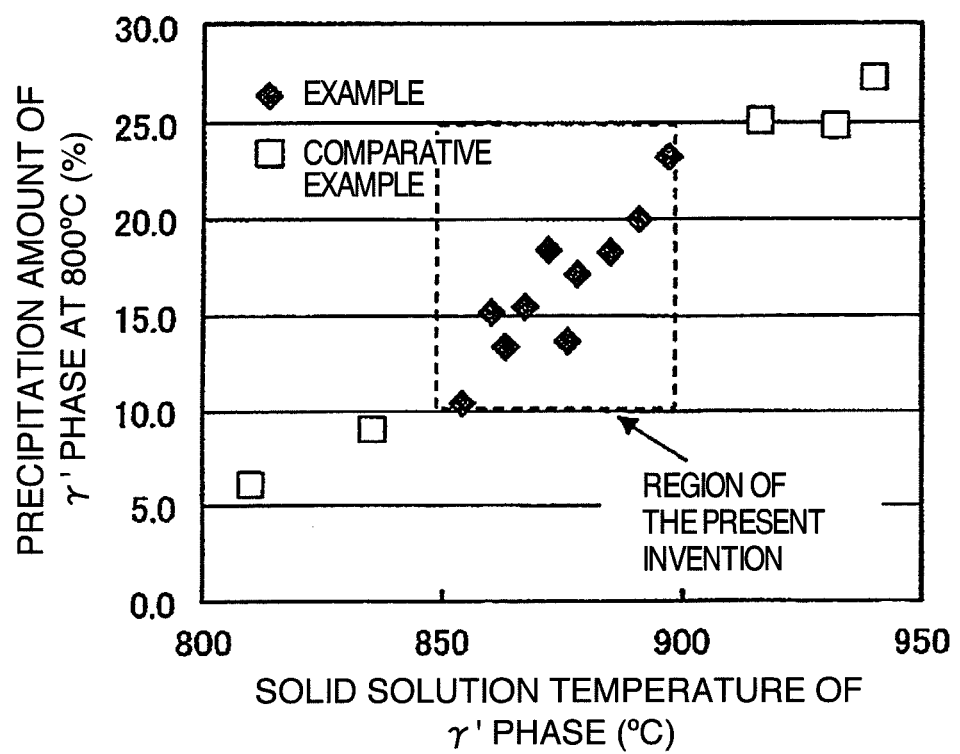
FIG. 3 is a graph of a correlation between a solid solution temperature and a precipitation amount of a γ' phase.

FIG. 3 shows a correlation between a solid solution temperature of the γ' phase and a precipitation amount of the γ' phase at 800° C. of each alloy.

In the figure, a relationship therebetween is generally proportional, and there is a tendency that the solid solution temperature is high and the precipitation amount increases as the amount of Al is large and the stability of the γ' phase is high.

The alloy of the present invention needs to have a solid solution temperature in a range of 850 to 900° C. from a viewpoint of the weldability, and have the precipitation amount of the γ' phase at 800° C. of 10 to 25% from a viewpoint of the strength at the service temperature. Specifically, the solid solution temperature of the γ' phase and the precipitation amount of the γ' phase need to be within the range shown by a dotted line in the figure.

As long as the alloy satisfies the above solid solution temperature of the γ' phase and precipitation amount of the γ' phase, a welded joint having both weldability and strength can be obtained, and the alloy can be used for a weld member such as a boiler, a steam turbine and a gas turbine which are used at a high temperature of approximately 800° C. As for a form of the alloy to be used as the welding material, any of a wire shape, a rod shape and a powder shape is considered to provide a similar effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A product having a welded portion formed of a Ni-based alloy for a welding material used at a temperature of 700 to 800° C. comprising, by mass, 0.01 to 0.04% of C, 18 to 25% of Co, 16 to 20% of Cr, 2.5 to 3.5% of Al, more than 11.5% and up to 14.0% or less of Mo+W, 0.001 to 0.03% of B and the balance being Ni and inevitable impurities,
wherein the welded portion has a γ' ($Ni_3Al$) strengthening phase, a solid solution temperature of the γ' ($Ni_3Al$) strengthening phase being in a range of 850 to 900° C., and a precipitation amount of the γ' ($Ni_3Al$) strengthening phase at 800° C. being 10 to 25% by volume.

2. The product according to claim 1, wherein the Ni-based alloy contains, by mass, 20 to 23% of Co, 17 to 19% of Cr, 2.8 to 3.2% of Al, 10.0 to 12.0% of Mo+W and 0.003 to 0.01% of B.

3. The product according to claim 1, wherein a creep rupture time of the welded portion under conditions of 800° C. and 294 MPa is 200 hours or longer.

4. A welding wire for forming the welded portion of the product according to claim 1.

5. A welding rod for forming the welded portion of the product according to claim 1.

6. A welding powder for forming the welded portion of the product according to claim 1.

* * * * *